Patented Mar. 3, 1942

2,274,749

UNITED STATES PATENT OFFICE 2,274,749

HYDROCARBON COPOLYMER AND METHOD OF PREPARING SAME

William H. Smyers, Westfield, N. J., assignor to Standard Oil Development Company, a corporation of Delaware No Drawing. Application July 17, 1937, Serial No. 154,199

20 Claims. (Cl. 260—86)

This invention deals with the preparation of new and useful co-polymers of hydrocarbons. More specifically, it relates to the co-polymerization of aliphatic olefines with other polymerizable materials to yield products having different properties than those of the polymers of the pure individual constituents employed in the preparation of these co-polymers.

For the production of co-polymers according to this invention, it is necessary to employ at least two starting materials, (1) a polymerizable aliphatic olefine and (2) a different reactive organic compound also capable of polymerization by itself.

The first ingredient for the reaction mixture is preferably an aliphatic iso-olefine having 4 to 8 or 10 carbon atoms capable of forming by itself (under suitable conditions) a linear polymer having a molecular weight of at least 800, as determined by the viscosity method explained in Staudinger's book, "Die Hochmolekularen Organischem Verbindungen," H. Staudinger, Berlin 1932, Verlag Von Julius Stringer, page 56. A particularly desirable olefine for this purpose is an iso-olefine, especially a methyl 2Δ1 olefine such as isobutylene, methyl-2 butene-1, etc. These compounds form high molecular weight linear polymers which are plastic solids, substantially saturated with respect to hydrogen (iodine number not more than about 10, and generally between 1 and 5). This type of polymerization is attributed to olefines having the general formula $R(R')C=CH_2$ in which R and R' are alkyl groups, preferably having 1 to 4 or 5 carbon atoms, and R preferably being different from R'. Even normal olefines may be co-polymerized with aromatic olefines such as styrene, although iso-olefines of the type mentioned above work much better.

The second ingredient is any polymerizable organic compound, other than the aliphatic olefines just described, but is preferably a compound containing at least one aromatic nucleus. Organic compounds usually polymerize according to two general types of reactions. The first type is the linear chain formation wherein a monomer, such as R, would polymerize in substantially a straight line to give a long molecule of high molecular weight, say over 800:

Such linear polymers are generally exemplified by their high viscosity index and their ability to raise the viscosity index of oils in which they dissolve. The high molecular weight polymers of this type are quite rubbery in nature and generally decompose without any definite melting point.

The other type of reaction is one wherein the monomer (R) cyclizes into rings, as exemplified by:

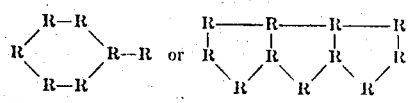

These latter polymers generally have relatively low molecular weights (less than about 800) and usually lower the viscosity index of oils in which they are soluble. The highly condensed polymers of this class are rather brittle resins having definite fusion points.

In the first class, compounds forming linear polymers are styrene, cyclohexene, and the like.

The other class of compounds giving cyclic polymers involves aromatic olefines (such as indene, coumarone, divinyl benzene), terpenes (e. g. pinene, dipentene, alpha phellandrene, etc.), and the like.

Other types of compounds give different types of polymers according to the temperature and other conditions of polymerization, generally giving cyclic polymers at relatively higher temperatures and linear polymers at relatively lower temperatures. For example, it is well known that acetaldehyde polymerizes to form at least three different compounds:

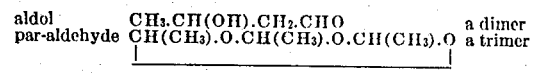

and met-aldehyde which is metameric with par-aldehyde and supposed to be a stereoisomer thereof.

When polymerized at low temperatures, e. g. below 0° C. and preferably below —50° C. or —100° C., with $BF_3$ or other active halide catalyst, it is believed a still different type of polymer is formed:

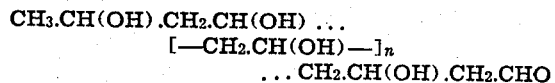

where $n$ represents a large integer such as 5 to 5,000. This polymer may be produced as a viscous liquid or a plastic solid having a high molecular weight, i. e. 250, 500, 1,000, 5,000, 50,000, 100,000 or higher. It is insoluble in pure hydrocarbon liquids, e. g. liquefied propane, naphtha, etc., and soluble or swellable in oxygen-containing organic solvents such as alcohol, acetone, as well as acetaldehyde itself, and is also soluble in halogenated hydrocarbon solvents such as carbon tetrachloride, chloroform, methyl chloride, and ethylene dichloride. Other aldehydes such as formaldehyde, propionaldehyde, furfural, etc., may similarly be polymerized to high molecular weight polymers. The polymerization is preferably effected in the presence of a halogenated hydrocarbon or other liquid solvent for the aldehyde, which liquid may or may not be a solvent for the resulting polymer.

Likewise, other oxygen-containing compounds may be converted by controlled polymerization at low temperature into high molecular weight polymers. Thus ketones, such as $CH_3CO.R$, where R is an alkyl or aryl group, such as acetone, methyl ethyl ketone, methyl phenyl ketone, etc. form:

$CH_3$—$C(OH)(R)$ ...

$[CH_2.C(OH)(R)]_n \ldots CH_2.CO.R$

The polymerizable organic compounds discussed in the above several classes form true polymers, i. e. without the formation of by-products such as water, etc.

By mixing the aliphatic olefine with the other polymerizable organic compound and subjecting the mixture to polymerization, a high molecular weight co-polymer substantially free from aliphatic unsaturatedness is obtained having a molecular weight above 800, or 1,500 and ranging up to 5,000, 40,000, 100,000 and even 200,000 or more.

Before polymerization it is desirable to make sure that the reaction mixture is present in one phase, i. e. that no substantial separation of the constituents has taken place. If the materials are immiscible, a mutual solvent for both may be added to obtain homogeneity. Such a solvent may be ethylene, propane, butane, cyclohexane, liquid carbon dioxide, sulfur dioxide, methyl chloride, chloroform, trichlorethane, carbon tetrachloride, dichlorethylene, acid treated naphtha, and the like.

The polymerization may be carried out by cooling the mixture below 0° C., say to —20° C., —40° C., —80° C. or even lower, and adding to the cooled mixture an active halide catalyst such as boron fluoride, aluminum chloride, titanium chloride, tin tetrachloride and the like. In the case of boron fluoride, only a small amount of the gas (0.01 to 0.1%) need be bubbled through, since the polymerization is quite violent and instantaneous. If a solvent such as propane or ethylene is employed, the heat of polymerization causes evaporation of some of the solvent, and this may be recompressed and used again in the process. Non-volatile diluents, e. g. mineral lube oils, may also be present. Pressures of 1 to 100 atmospheres or more may be used.

After completion of the polymerization, residual catalyst is removed by washing the product with water and finally with dilute aqueous caustic soda. The volatile solvent may be removed or not.

The co-polymers produced according to this process are interesting in that they generally acquire desirable modified properties of the individual polymers, yet they are not mechanical mixtures but true chemical compounds. They are also quite resistant to oxidation and attack by acids and alkalies. The structure of such compounds depends upon the proportions of the individual ingredients employed. For instance, if an olefine, R, were co-polymerized with an equal molar proportion of another reactive compound (X) capable of forming a linear polymer, then the co-polymer would probably have the structure:

—R—X—R—X—R—X—R—

With 2 moles of R to 1 mole of X, the co-polymer structure is probably:

... R—X—R—R—X—R—R—X—R—R—X ...

The proportion of the aliphatic olefine employed in the mixture may vary from 5% to 20% or 50% or 80% or even 90%, depending on the type of product desired, although it is generally desirable to maintain at least 50% of the aliphatic olefine in the reaction mixture. By adjusting the proportions of the two raw materials, co-polymers of substantially any desired hardness, melting point, plasticity, etc., may be obtained.

This invention will be more clearly understood by the following examples which illustrate many of the different phases involved:

*Example 1*

Polyisobutylene of about 50,000 average molecular weight was prepared by polymerization of isobutylene at about —80° C. with boron fluoride. This polymer was mixed at 50–100° C. with polystyrol prepared by heating styrene at 100° C. Upon cooling, a milky, partially thermoplastic mixture resulted showing that only a mechanical mixture of the two separate polymers was present.

Isobutylene was mixed with styrene (about 90% isobutylene and 10% styrene) and co-polymerized by bubbling boron fluoride through the mixture at —45° C. A clear, colorless, thermoplastic product was obtained which indicated no separation and which consisted of a true co-polymer of isobutylene and styrene.

*Example 2*

A co-polymer prepared by the polymerization of a mixture of 10% styrene and 90% isobutylene was added in 2% concentration in a hydrogenated mineral lubricating oil. As can be seen from the data below, this co-polymer raises both the viscosity and the viscosity index* of the oil:

| | Vis. °E/99° C. | V. I* |
|---|---|---|
| Mineral oil | 1.8 | 81 |
| Mineral oil+2% co-polymer | 2.2 | 95 |

*See 'Viscosity Variations of Oils With Temperature," E. W. Dean and G. H. B. Davis, Chem. & Met., vol. 36, p. 618–9 (Oct. 1929).

*Example 3*

Styrene was co-polymerized with isobutylene at a temperature of about —10° C., using boron fluoride as a catalyst. The product analyzed 12.11% hydrogen and 87.67% carbon, indicating a proportion of about 33:67 of styrene:isobutylene in the co-polymer. (Pure isobutylene polymer has 14.3% H and 85.7% C, and pure styrene polymer has 7.7% H and 92.3% C.)

Repeatedly dissolving the polymerized product in a solvent, e. g. petroleum ether, and precipitating it out of solution in different fractions by adding a non-solvent, e. g. methanol, gave fractions which had substantially the same chemical composition as to carbon and hydrogen, which proves that the polymer is a true chemical compound and not a mixture of two different types of polymers. It is a thermoplastic solid which becomes solid when cold.

This co-polymer liquefies at about 80–100° C. and is estimated to have a molecular weight of about 15,000. This co-polymer is believed to have substantially the following chemical structure:

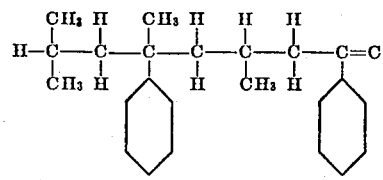

Example 4

About 70% by weight of an isopentene called methyl-2 butene-1 is co-polymerized with about 30% by weight of styrene at about −50° C. with boron fluoride as catalyst. The product is a clear, colorless thermoplastic solid.

Example 5

About equal weights of isobutylene and indene are mixed together and treated with boron fluoride at about −78° C. The copolymer obtained is soluble in oil and amyl acetate and is somewhat harder than polyisobutylene of 40,000 average molecular weight. It is more flexible than polyindene. The copolymer contained 87.21% carbon and 12% hydrogen.

Example 6

Styrene was co-polymerized with pentene obtained by the dehydration of secondary amyl alcohol, using boron fluoride as a catalyst. The co-polymer obtained showed 9.8% hydrogen and 90.1% carbon, equivalent to 68% styrene and 32% pentene in the co-polymer.

These co-polymers are especially suitable as addition agents to mineral or fatty oils in concentrations of 0.01 to 5 or 10 or even 50% or more for increasing viscosity and viscosity index. They may be added to greases, resins, rubbers (such as caoutchouc, crepe, smoke sheet, guayule, polymerized butadiene or isoprene, polychlorprene, terpene-maleic acid polymers and derivatives, polyolefine sulfides, halogenated rubbers, haloformed rubber, such as that obtained by reacting rubber with chlorstannic acid, polyisobutylene, benzene-ethylene dichloride condensation product, and the like) with or without the addition of vulcanizing agents followed by curing. Pigments, dyes, anti-oxidants, etc. may be added to the co-polymers. The co-polymers may also be mixed with powdered or granular solids, e. g. carbon black, ZnO, clay, chalk, etc., mineral or esterwaxes, asphalts, polysulfones, coating compositions such as paints, varnishes and lacquers, cellulose esters and ethers, self supporting films, and the like. The co-polymers can also be halogenated or reacted with sulfur chloride to produce new useful derivatives.

The thermoplastic co-polymers of an aliphatic olefine and an aromatic olefine, such as co-polymers of isobutylene and styrene, are especially well suited for use, either alone or diluted by solution in 1–10 parts of a mineral oil, or mixed with rubber or other easily vulcanizable material and vulcanized, for insulating electric wires, cables, etc.

These co-polymers, especially the thermoplastic ones, are also desirable for use in coating or impregnating paper, cloth, wood, metal, bricks, tiles, etc., preserving fruits, vegetables, shrubbery, etc., sealing cuts and wounds on trees, roofing paper, shingles, substitute for tar and asphalt for roofing, paving, making building blocks. etc., as a binder for cork, asbestos, straw, etc., in making synthetic floor covering of the linoleum type, or artificial building boards or roof shingles, as a binder for making laminated products such as paper-paper, cloth-cloth, paper-metal foil, glass-glass (alone or with tough unbreakable film intermediate), and many other uses.

The invention is not to be limited to the specific embodiments shown or the specific examples given, nor to any theories advanced as to the operation of the invention, but in the appended claims it is intended to claim all inherent novelty in the invention as broadly as the prior art permits.

I claim:

1. A co-polymer having a molecular weight above 1500 prepared by polymerizing at a temperature below 0° C. in the presence of an active halide polymerization catalyst a mixture of an aliphatic olefine having more than two carbon atoms, and a different reactive mono-olefinic hydrocarbon capable of polymerization and containing a cyclic nucleus said materials constituting the sole reactants.

2. The process which comprises copolymerizing an aliphatic olefine and a polymerizable mono-olefinic hydrocarbon compound containing a cyclic nucleus, said materials constituting the sole reactants, at a temperature below about 0° C. in the presence of an active halide polymerization catalyst, to produce substantially clear, colorless, thermoplastic, solid, hydrocarbon copolymers having a molecular weight above about 1500.

3. Process according to claim 2 in which the aliphatic olefine is an olefine having 3 to 6 carbon atoms.

4. Process according to claim 2 in which the aliphatic olefine is isobutylene.

5. Process according to claim 2 in which the polymerizable hydrocarbon containing a cyclic nucleus is styrene.

6. Process according to claim 2 in which the aliphatic olefine has the general formula $$R(R')C=CH_2$$

in which R and R' are alkyl groups having 1–5 carbon atoms.

7. The process according to claim 2, in which boron fluoride is used as the catalyst.

8. The process according to claim 2, carried out at a temperature below about −40° C.

9. Process according to claim 2, carried out in the presence of a mutual solvent for the two polymerizable constituents.

10. Process according to claim 2, carried out in the presence of an inert volatile organic liquid serving as solvent, and refrigerant.

11. Process according to claim 2 carried out in the presence of a chlorinated hydrocarbon having not more than 2 carbon atoms, as a mutual solvent.

12. Process according to claim 2 carried out in the presence of methyl chloride.

13. Process according to claim 2 in which the polymerizable hydrocarbon containing a cyclic nucleus is an aromatic olefin.

14. The process which consists in copolymerizing isobutylene with styrene at a temperature below 0° C. in the presence of boron fluoride as catalyst, whereby a copolymer having a molecular weight above about 1500 is produced.

15. The process which consists in copolymerizing equal weights of isobutylene and indene with boron fluoride at a temperature of about −78° C., whereby a copolymer is produced having a molecular weight of about 40,000.

16. The process of preparing substantially colorless, thermoplastic hydrocarbon compounds having a molecular weight above about 1500 which comprises copolymerizing an aliphatic iso-olefin having the general formula $$R-(CH_3)C=CH_2$$

where R is an alkyl group having not more than 2 carbon atoms with a polymerizable mono-olefinic hydrocarbon compound containing an aromatic nucleus said materials constituting the sole reactants, at a temperature not substantially above $-10°$ C., in the presence of an active halide polymerization catalyst, and removing the catalyst from the polymerization product.

17. The process of preparing clear, colorless, oil-soluble, thermoplastic, solid hydrocarbon compounds having a molecular weight of at least about 15,000 which comprises copolymerizing a mixture of isobutylene and styrene, said materials constituting the sole reactants, the amount of isobutylene being at least equal to that of the styrene, at a temperature not substantially above $-10°$ C., in the presence of boron fluoride as catalyst, and removing residual boron fluoride from the polymerization product.

18. Process according to claim 17 in which the amount of isobutylene used is 50 to 90% of the total amount of isobutylene and styrene, and which process is carried out at a temperature not substantially above $-40°$ C.

19. A copolymer having a molecular weight above 3,000 prepared by polymerizing at a temperature below $0°$ C. in the presence of an active halide polymerization catalyst, a mixture of an aliphatic olefin having more than 2 carbon atoms and a different reactive olefinic hydrocarbon capable of polymerization and containing an aromatic nucleus, said materials constituting the sole reactants, said copolmyer being essentially a clear, colorless, thermoplastic, solid, linear type hydrocarbon copolymer substantially free from aliphatic unsaturatedness, normally quite resistant to oxidation and attack by acids and alkalies, and containing a plurality of aliphatic hydrocarbon groups and aromatic nuclei and 86–92% carbon and 14–8% hydrogen.

20. A copolymer prepared by polymerizing at a temperature below $0°$ C. in the presence of an active halide polymerization catalyst, a mixture of isobutylene and styrene, said materials constituting the sole reactants, said copolymer being essentially a clear, colorless, oil-soluble, thermoplastic, solid isobutylene-styrene copolymer having a molecular weight of about 15,000 containing about 12.1% of hydrogen and about 87.7% of carbon, and softening at a temperature of about 80–100° C.

WILLIAM H. SMYERS.